Aug. 11, 1931.   J. L. DRAKE   1,818,203
METHOD AND APPARATUS FOR PRODUCING MOLTEN GLASS
Filed July 27, 1927
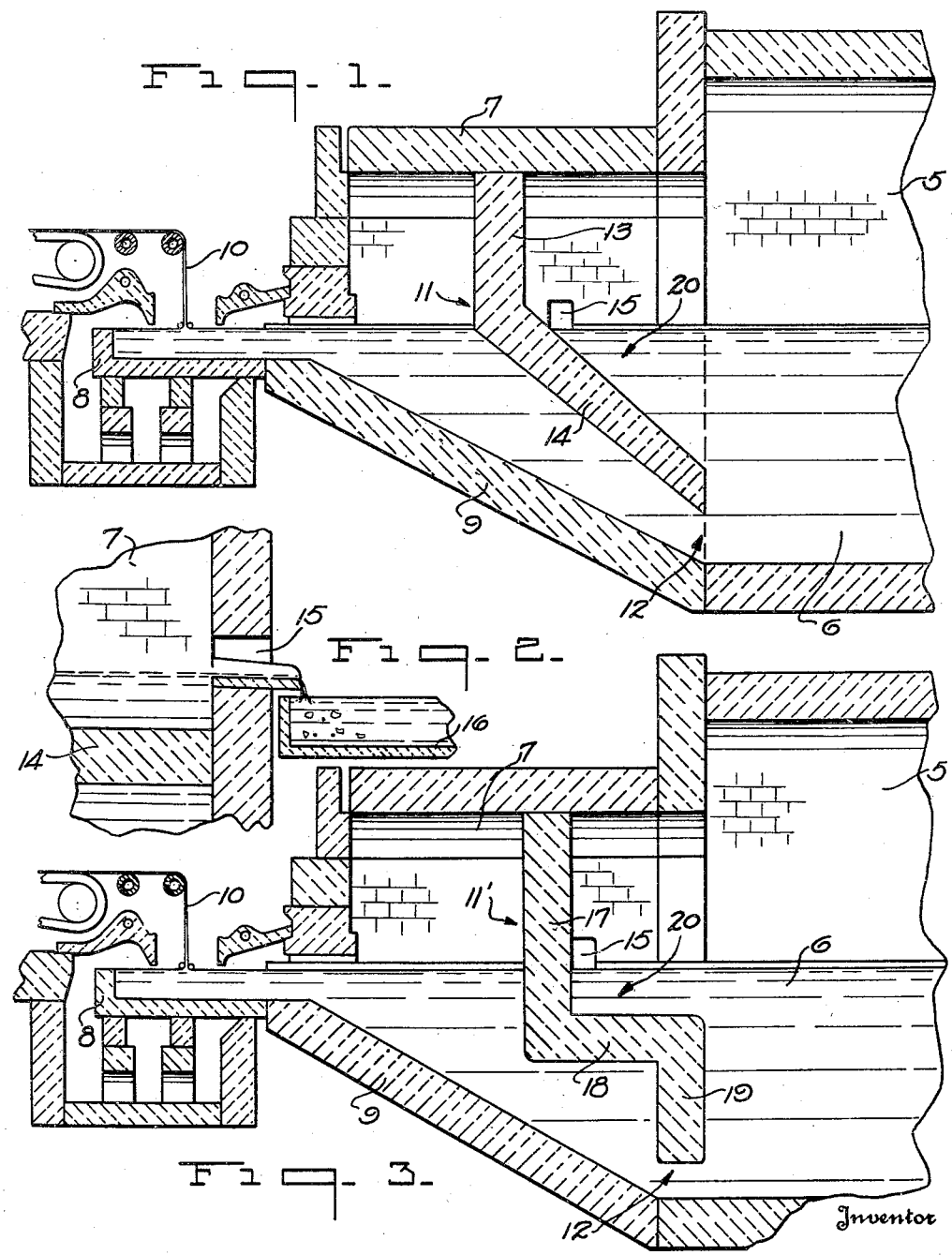
Inventor
John L. Drake.
By Frank Fraser,
Attorney Patented Aug. 11, 1931

1,818,203

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING MOLTEN GLASS

Application filed July 27, 1927. Serial No. 208,694.

This invention relates to an improved method and apparatus for producing molten glass.

In the manufacture of sheet glass, it is customary to melt glass in one end of a tank furnace and have a continuous flow movement thereof through said furnace, the glass being worked into a commercial article or articles at the opposite end thereof. The time required or allowed in such furnaces for the melting and refining of the glass is relatively short, and it is believed insufficient for the proper conditioning, this being caused by the fact that the upper stratum of the molten glass moves toward the point of draw much more rapidly than the remaining glass with the result that the lower glass remains practically stationary. Sheet glass produced from improperly refined glass usually contains a considerable number of seeds, blisters and other well known defects which impair the quality of the finished product.

Also, in furnaces of this type, the sheet is ordinarily drawn from the surface or uppermost stratum of molten glass and since a certain amount of scum, etc. usually forms upon this surface glass it is not as desirable as is the substratum glass which is usually of a somewhat better quality. Moreover, it is advisable that this scum, etc. be prevented from finding its way into the finished sheet.

An object of the present invention is to provide a tank furnace of improved construction wherein the molten glass will be caused to flow therethrough more slowly than heretofore with the result that the said glass will be given a longer and it is believed sufficient length of time to completely refine and settle before it is introduced into the finished article to the end that the said glass will be, practically speaking, free from seeds, blisters, etc.

Another object of the invention is to provide an improved tank furnace with means for effectively preventing the surface glass upon which the scum, etc. usually forms from finding its way into the path of the molten glass being drawn therefrom.

A further object of the invention is to provide an improved tank furnace of this nature including a melting chamber and a cooling chamber associated therewith, means being provided for causing the lowermost stratum of molten glass to flow from the melting chamber into said cooling chamber, and means being also provided for catching the uppermost stratum or surface glass and causing it to flow exteriorly of the furnace.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through a portion of an improved tank furnace constructed in accordance with the present invention.

Fig. 2 is a transverse section through a portion thereof, and

Fig. 3 is a longitudinal vertical section showing a slightly modified construction.

Referring now to the drawings and particularly to Figs. 1 and 2, the numeral 5 designates a portion of a melting tank within which the glass batch ingredients are melted to form a mass of molten glass 6. This tank may be of any suitable length, the end into which the glass batch is introduced being ordinarily termed the melting end and the opposite end the refining end.

Arranged adjacent to and in direct communication with the melting tank 5 is a cooling chamber 7 and associated with this cooling chamber is a preferably shallow working receptacle or draw-pot 8, the bottom 9 of the cooling chamber 7 being inclined upwardly from the melting tank to the working receptacle.

Ordinarily, in furnaces of this nature, the molten glass, after being produced within the melting end of tank 5 is adapted to flow into the refining end thereof and thence through the cooling chamber 7 into the working receptacle 8 from which it may be drawn away in sheet form as at 10 or formed into other glass articles as desired.

As brought out above, due to the constant removal of the molten glass at one end of the furnace and the constant replacement of the glass batch ingredients at the opposite end thereof, the flow of molten glass through the furnace is relatively fast so that the time required or allowed for the melting and refining is comparatively short. It is an aim of the present invention to provide means whereby the molten glass will be caused to remain within the furnace for a longer period of time so that it will be given a sufficient length of time to completely refine and settle before it is introduced into the sheet or other glass article.

To this end, there is arranged within the cooling chamber 7, approximately intermediate its ends, a depending baffle wall 11, said wall projecting downwardly into the molten glass and terminating in close proximity to the bottom of the furnace to provide a relatively narrow passage 12 through which the molten glass is adapted to flow from the melting tank into the cooling chamber.

By arranging the baffle wall in this manner, only the lowermost stratum of molten glass will be permitted to flow into the cooling chamber with the result that the glass will remain within the melting tank for a longer period than in a regular tank furnace. In other words, the molten glass must not only flow through the tank but must also settle to the bottom thereof before it is removed. In prior constructions, the surface glass would flow quite rapidly through the furnace into the working receptacle while the lower glass would remain practically stationary.

After the glass flows through the passage 12, it must then flow upwardly into the working receptacle. Thus, by the time the molten glass reaches the working receptacle, it will be, practically speaking, completely refined and settled and in proper condition for working. Also, the finished product should be of a much better quality since it would be drawn from the substratum glass instead of the surface glass which, as stated above, usually has a certain amount of scum, etc. floating thereon.

The present invention further proposes the provision of means for effectively preventing the surface glass from finding its way into the path of the glass flowing from the melting tank and in this way being drawn therewith into the working receptacle and ultimately into the article being produced. This is accomplished by constructing the baffle wall 11 with a substantially vertical portion 13 and a rearwardly and downwardly slanting portion 14, which latter portion terminates at substantially the juncture of the melting tank 5 and cooling chamber 7.

By constructing the baffle wall in this manner, there will be created a pocket or the like 20 for receiving the surface glass. The side walls of the cooling chamber 7 are provided immediately adjacent the baffle wall 11 with openings 15 which are preferably disposed slightly beneath the level of the molten glass in order that the surface glass will be permitted to readily flow therethrough. The molten glass flowing through these openings will exert a constant pull upon the remaining surface glass which will cause this glass to flow exteriorly of the furnace into suitable receptacles or containers 16 which may contain water or the like for rapidly cooling the glass. Thus, the surface glass upon which the scum, etc. usually forms will flow through the furnace and be caught within the pocket 20 from which it will be caused to flow exteriorly of the furnace through the openings 15. This surface glass will, in this manner, be prevented from finding its way into the path of draw and thereby being carried with the substratum glass through the cooling chamber into the working receptacle.

In the modification shown in Fig. 3, the construction of the apparatus is substantially the same with the exception that the baffle wall 11' is stepped and comprises an upper vertical portion 17, a horizontal portion 18 and a lower vertical portion 19. The advantages to be gained by the use of such a constructed baffle wall are the same as described hereinabove in connection with the type of wall illustrated in Fig. 1.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In a continuous tank furnace, a melting tank containing a mass of molten glass, a cooling chamber in communication with the said melting tank, means for causing the lowermost stratum of molten glass within the melting tank to flow through the cooling chamber, and means for causing the uppermost stratum or surface glass to flow exteriorly of said melting tank.

2. In a continuous tank furnace, a melting tank containing a mass of molten glass, a cooling chamber in communication with said melting tank, and means arranged within the cooling chamber and depending within the molten glass for causing the lowermost stratum of molten glass within said melting tank to flow through the cooling chamber, the said cooling chamber being provided with openings beneath the level of the molten glass for causing the uppermost stratum or surface glass to flow exteriorly thereof.

3. In a continuous tank furnace, a melting tank containing a mass of molten glass, a cooling chamber communicating with said melting tank, and a member arranged within the cooling chamber and depending within the molten glass for causing the lowermost stratum of molten glass to flow into and through said cooling chamber, said member being constructed to form a pocket for receiving the uppermost stratum or surface glass, and the walls of the cooling chamber being provided with openings disposed beneath the level of the molten glass for causing this surface glass to flow exteriorly thereof.

4. In a continuous tank furnace, a melting tank containing a mass of molten glass, a cooling chamber communicating with said melting tank, and a baffle wall arranged within said cooling chamber, said wall depending within the molten glass and terminating in close proximity to the bottom of said furnace, the lower portion of said wall being closer to the melting tank than the upper portion thereof.

5. The method of producing molten glass which consists in establishing a mass of molten glass in a container, flowing the lowermost stratum of glass only from said mass into a second container, and in simultaneously removing the uppermost stratum of glass from said mass.

6. The method of producing molten glass which consists in establishing a mass of molten glass in a container, a continuously flowing the lowermost stratum of glass only from said mass into a second container, and in continuously flowing the uppermost stratum of glass from said mass by creating a constant pull thereon.

7. In a continuous tank furnace, a melting tank containing a mass of molten glass, a cooling chamber communicating with said melting tank, and a member arranged within the cooling chamber and depending within the molten glass for causing the lowermost stratum of molten glass to flow into said cooling chamber, said member being so constructed as to form a pocket for catching the uppermost stratum or surface glass, said pocket having outlets through which the surface glass is caused to flow exteriorly of the furnace.

8. In a continuous tank furnace, a melting tank containing a mass of molten glass, a cooling chamber in communication with the melting tank, and means arranged within the cooling chamber and depending within the molten glass and terminating in close proximity to the bottom of said furnace for causing the lowermost stratum of molten glass within said melting tank to flow through the cooling chamber, the said cooling chamber being provided with openings beneath the level of the molten glass for causing the uppermost stratum or surface glass to flow exteriorly thereof.

Signed at Toledo, in the county of Lucas and State of Ohio, this 23rd day of July, 1927.

JOHN L. DRAKE.